United States Patent [19]

Kondo et al.

[11] 4,345,561

[45] Aug. 24, 1982

[54] AIR-FUEL RATIO CONTROL METHOD AND ITS APPARATUS

[75] Inventors: Toshio Kondo, Anjo; Yasuo Sagisaka, Kariya; Masahiko Tajima, Takahama; Akio Kobayashi, Kariya, all of Japan

[73] Assignee: Nippondenso Co., Ltd., Kariya, Japan

[21] Appl. No.: 136,706

[22] Filed: Apr. 2, 1980

[30] Foreign Application Priority Data

Apr. 5, 1979 [JP] Japan ................................ 54/41360

[51] Int. Cl.³ .......................... F02B 3/00; F02G 3/00; F02D 5/00; G05B 15/00

[52] U.S. Cl. .................................... 123/440; 123/478; 123/486; 364/431.04

[58] Field of Search ............... 123/440, 478, 480, 486, 123/487, 489; 364/431.04

[56] References Cited

U.S. PATENT DOCUMENTS

| | | | |
|---|---|---|---|
| 3,838,397 | 9/1974 | Watson et al. | 123/486 |
| 4,130,095 | 12/1978 | Bowler et al. | 123/440 |
| 4,155,332 | 5/1979 | Taegashi et al. | 123/480 |
| 4,167,924 | 9/1979 | Carlson et al. | 123/440 |
| 4,172,433 | 10/1979 | Bianchi et al. | 123/489 |
| 4,181,944 | 6/1980 | Yamauchi et al. | 364/431 |
| 4,210,106 | 7/1980 | Wessel et al. | 123/440 |
| 4,214,306 | 7/1980 | Kobayashi | 364/431 |
| 4,228,775 | 10/1980 | Schweikert | 123/440 |
| 4,257,377 | 3/1981 | Kinugawa et al. | 123/480 |

*Primary Examiner*—R. A. Nelli

*Attorney, Agent, or Firm*—Cushman, Darby & Cushman

[57] ABSTRACT

An apparatus for controlling an air-fuel ratio of a combustion engine with a memory device for storing correct values for air-fuel control in accordance with an intake condition of said combustion engine and a rotation speed of the same. In the apparatus, an air-fuel ratio represented by the exhaust gas composition of the internal combustion engine is sensed and the sensed value is integrated. When the integrated value from the integrator fails within a predetermined range of values, one of the correction values for the air-fuel ratio control is corrected in accordance with a current condition of the internal combustion engine. When the integrated value falls outside the predetermined range, the correction values are replaced by a predetermined reference value and an air-fuel ratio of mixture supplied to the combustion engine is controlled in accordance with the correction values for the air-fuel ratio stored.

6 Claims, 6 Drawing Figures

| Q \ N | 1 | 2 | 3 | --- | --- | n-2 | n-1 | n | n+1 | n+2 | --- | --- | |
|---|---|---|---|---|---|---|---|---|---|---|---|---|---|
| 1 | $K_1^1$ | $K_2^1$ | $K_3^1$ | | | | | | | | | | |
| 2 | $K_1^2$ | $K_2^2$ | $K_3^2$ | | | | | | | | | | |
| 3 | $K_1^3$ | $K_2^3$ | $K_3^3$ | | | | | | | | | | |
| ¦ | | | | | | | | | | | | | |
| m-1 | | | | | | $K_{n-2}^{m-1}$ | $K_{n-1}^{m-1}$ | $K_n^{m-1}$ | $K_{n+1}^{m-1}$ | $K_{n+2}^{m-1}$ | | | |
| m | | | | | | $K_{n-2}^{m}$ | $K_{n-1}^{m}$ | $K_n^{m}$ | $K_{n+1}^{m}$ | $K_{n+2}^{m}$ | | | |
| m+1 | | | | | | $K_{n-2}^{m+1}$ | $K_{n-1}^{m+1}$ | $K_n^{m+1}$ | $K_{n+1}^{m+1}$ | $K_{n+2}^{m+1}$ | | | |
| ¦ | | | | | | | | | | | | | |
| ¦ | | | | | | | | | | | | | |

AIR-FUEL RATIO CONTROL METHOD AND ITS APPARATUS

BACKGROUND OF THE INVENTION

The invention relates to an air-fuel control method and apparatus which detects the air-fuel ratio of an air-fuel mixture supplied to an internal combustion engine from the exhaust gas of the engine, and controls the air-fuel ratio of the mixture to a fixed value in response to the detection.

Conventionally, the output signal from a combustion components sensor was merely integrated. In a period of transient engine operation, during which the basic air-fuel ratio changed faster than the correcting speed of the integration control, the correction failed to follow the change of the basic air-fuel ratio. Further, when the combustion components sensor was inactive, feedback control of the air-fuel ratio was impossible, resulting in the generation of noxious exhaust gases.

SUMMARY OF THE INVENTION

Accordingly, an object of the invention is to provide an air-fuel ratio control method and apparatus which may control the air-fuel ratio to a fixed value quickly even during transient engine operation, and which may control the air-fuel ratio with a high degree of precision by using an engine condition correction value stored in a memory even when the combustion components sensor is inactive at a low engine temperature.

The above object is achieved by storing values corresponding to the integrated combustion components sensor output correction values in a memory, at a location corresponding to the condition of the engine, as engine condition correction values. A combination of the stored correction value corresponding to the current engine condition and the present integration correction value is used for feedback control of the air-fuel ratio.

Another object of the invention is to provide an air-fuel ratio method and apparatus which determines if an integration correction value or an engine condition correction value falls within a region between upper and lower limits and takes an appropriate measure on the basis of the determination. This approach overcomes a disadvantage that, when the combustion components sensor or its signal transmission line fails, the integration correction value or the engine condition correction value greatly deviates from a normal value and the air-fuel ratio being controlled greatly deviates from its desired value.

According to the invention, there is provided an air-fuel ratio control method which comprises the steps of integrating a signal from the combustion components ratio sensor, computing an engine condition correction value corresponding to an engine condition on the basis of the integration correction value obtained by the integration and storing the computed value in a memory, and determining whether the correction value obtained by the just-mentioned step or the integration correction value obtained by the integrating step is within a fixed region between the upper and lower limits. If the correction value is within the range, the air-fuel ratio is controlled by the engine condition correction value obtained by the computation and the integration correction value.

With such a method, even during transient engine operation, the air-fuel ratio may be controlled to desired air-fuel ratio quickly. Even when the feedback control is ineffective due to an inactive state of the combustion components sensor, the air-fuel ratio may be controlled with a high accuracy by using the engine condition correction value. Further, the integration correction value and the engine condition correction value are monitored to determine if they fall within a predetermined region between upper and lower limits. If they are not within the range, as when trouble occurs in the combustion components sensor or its signal transmission system, the engine condition correction values are replaced by a value representing that no correction is made, to prevent the air-fuel ratio from greatly deviating from the desired value.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENT

Figures 1, 6:
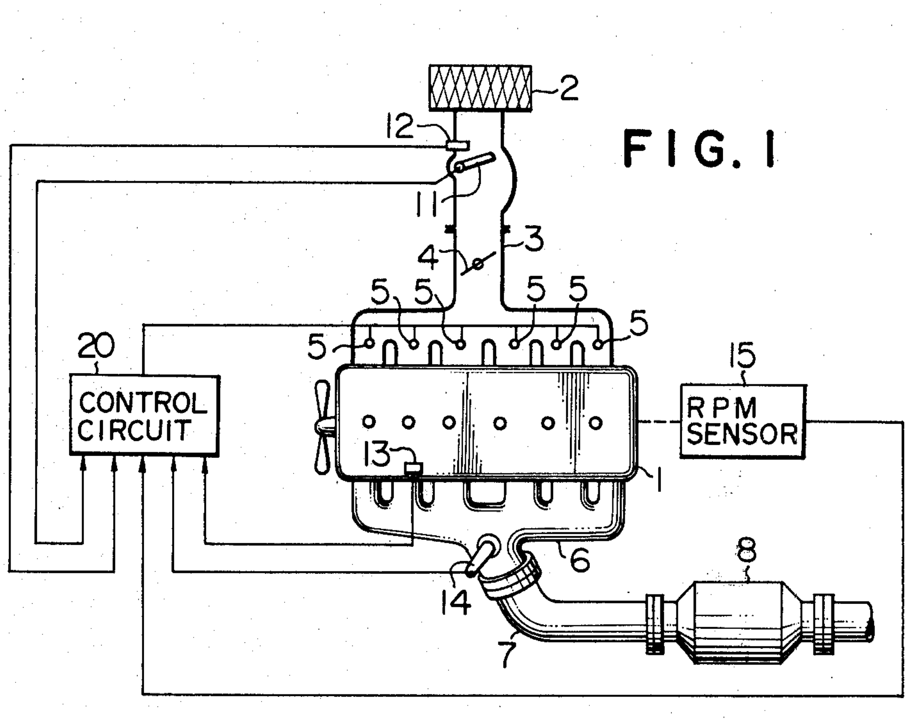
FIG. 1 is a schematic diagram showing the overall construction of an embodiment of the present invention.
FIG. 6 is a map of the correction values K3 useful in explaining the operation of the embodiment in FIG. 1.

Referring to FIG. 1 showing an embodiment of the invention, an engine 1 is a well-known four-cycle spark ignition type engine adapted for installation on automobiles which receives combustion air by way of an air cleaner 2, an intake pipe 3 and a throttle valve 4. The fuel is supplied to the engine 1 from the fuel system (not shown) by way of electromagnetic fuel injection valves 5 mounted for the respective cylinders. The exhaust gases resulting from the burning of the mixture are discharged to the atmosphere through an exhaust manifold 6, an exhaust pipe 7, an exhaust purifying catalytic converter 8, etc. Mounted in the intake pipe 3 are both a potentiometer-type air-flow sensor 11 for generating an analog voltage corresponding to the quantity of air which is taken into the engine 1, and a thermistor-type intake-air temperature sensor 12 for and generating an analog voltage (analog detection signal) corresponding to the temperature of the air taken into the engine 1. Also mounted in the engine 1 is a thermistor-type water temperature sensor 13 for generating an analog voltage (analog detection signal) corresponding to the temperature of the cooling water. The exhaust gas manifold 6 is further provided with a combustion components sensor 14 which senses combustion components representative of the air-fuel ratio from the oxygen concentration in the exhaust gas and produces a voltage of about 1 V (high level) when the combustion components sensed represent an air-fuel ratio smaller than the stoichiometric air-fuel ratio, i.e., it is rich, and produces a voltage of about 0.1 V (low level) when the represented air-fuel ratio is larger than the stoichiometric air-fuel ratio, i.e., it is lean. A rotational or engine speed (or number of revolutions) sensor 15 senses the rotational speed of the crankshaft of the engine 1 to generate a pulse signal having a frequency corresponding to the rotational speed or the number of revolutions of the engine. The ignition coil of the as the rotational speed sensor 15, for example, and the ignition pulse signal from the ignition coil primary terminal may be used as a rotational speed signal. A control circuit 20 computes both computing the amount of fuel to be injected in accordance with the detection signals from the sensors 11 to 15, and the duration that the electromagnetic fuel injection valve 5 is to be opened so as to adjust the amount of fuel injected.

Figure 2:
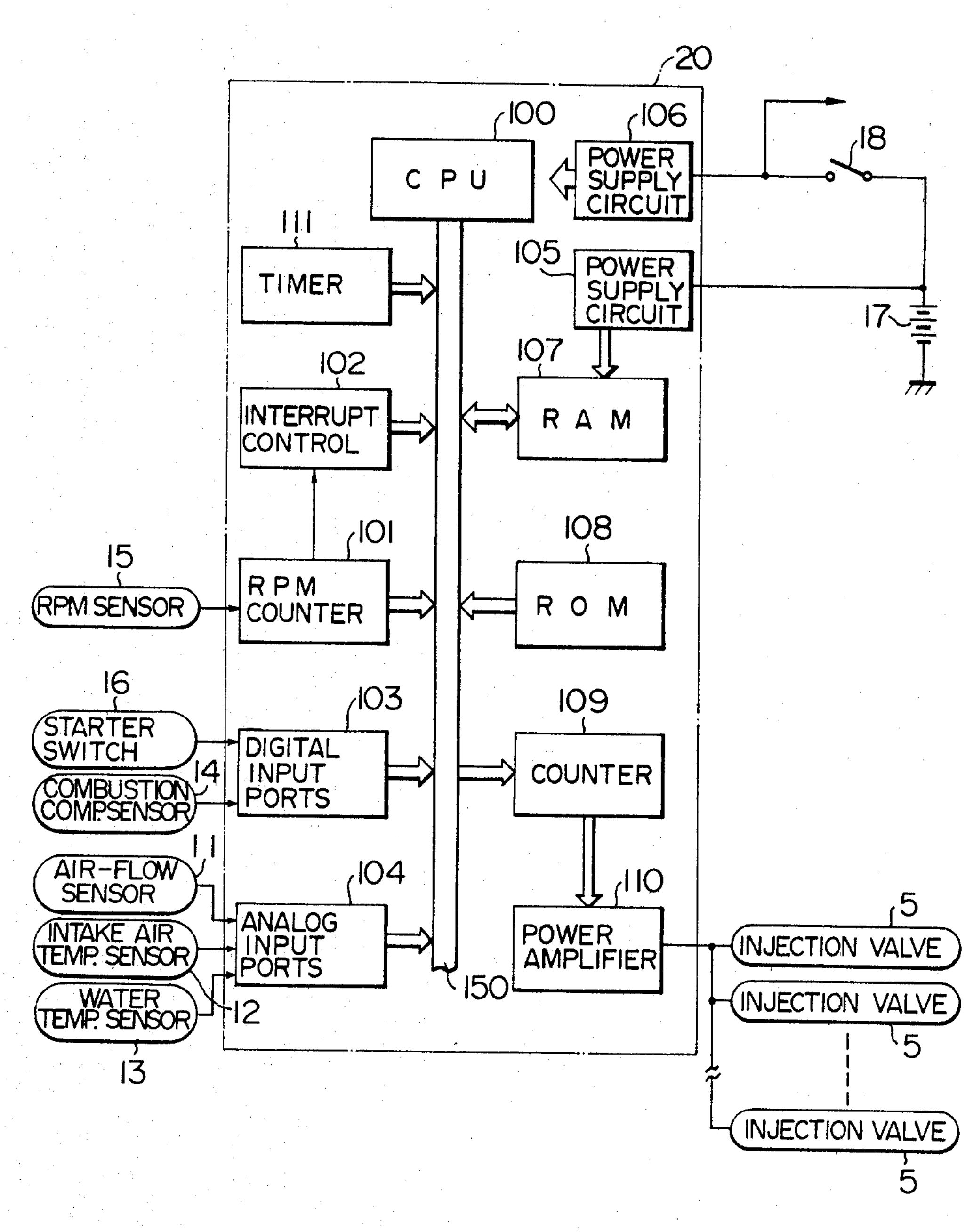
FIG. 2 is a block diagram of the control circuit shown in FIG. 1.

With reference to FIG. 2 the control circuit 20 will be described. In FIG. 2, numeral 100 designates a microprocessor (CPU) for computing the amount of fuel to be injected. Numeral 101 designates a counter for counting the number of engine revolutions in response to the signal from the rotational speed sensor 15. Also the counter 101 sends an interrupt command signal to an interrupt control section 102 in synchronism with the rotation of the engine 1. When the interrupt control 102 receives the signal, an interrupt request signal is outputted to the microprocessor 100 from the interrupt control 102 through a common bus 150. Numeral 103 designates digital input ports for transferring to the microprocessor 100 digital signals such as the output signal from a comparator which compares the output from the combustion components sensor 14 with a fixed reference level and a starter signal from the start switch 16 which turns on and off a starter (not shown). Numeral 104 designates analog input ports comprising an analog multiplexer and an A/D converter for converting each of the signals from the air-flow sensor 11, the intake-air temperature sensor 12 and the cooling water temperature sensor 13 to digital form and making the signals to be read into the microprocessor 100 successively. The output data from these units 101, 102, 103 and 104 are transferred to the microprocessor 100 through the common bus 150. Numeral 105 designates a power supply circuit for supplying power to a RAM 107 which will be described later. Numeral 17 designates a battery, and 18 a key switch. The power supply circuit 105 is connected to the battery 17 directly, and not through the key switch 18. Numeral 106 designates another power supply circuit connected to the battery 17 through the key switch 18. The power supply circuit 106 supplies power to the units except the RAM 107. The RAM 107 comprises a temporary read/write memory unit (RAM) which will be used temporarily when the computer is in operation and always receives power irrespective of the key switch 18 to prevent the stored contents from being erased even if the key switch 18 is turned off and the operation of the engine is stopped. The RAM 107 is formed by a non-volatile memory. Correction values K3 for engine conditions, which will be mentioned late are also stored in the RAM 107. Numeral 108 designates a read only memory (ROM) for storing a control program of the CPU 100, various constants, etc. Numeral 109 designates a fuel injection period controlling counter including a register. The counter 109 comprises a down counter whereby a digital signal computed by the microprocessor or CPU 100 and indicative of the valve opening period T of the electromagnetic fuel injection valves 5, or the fuel injection amount is converted into a pulse signal with a time width which determines the actual duration of opening of the electromagnetic fuel injection valves 5. Numeral 110 designates a power amplifier for actuating the electromagnetic fuel injection valves 5. Numeral 111 designates a timer for measuring and transferring the elapsed time to the CPU 100.

The counter for counting number of revolutions 101 is responsive to the output of the sensor 15 to measure the engine speed once for each engine revolution and upon completion of the measurement an interrupt command signal is applied to the interrupt control 102. In response to the applied signal, the interrupt control 102 generates an interrupt request signal and consequently the microprocessor 100 performs an interrupt handling routine which computes the amount of fuel to be injected.

Figure 3:
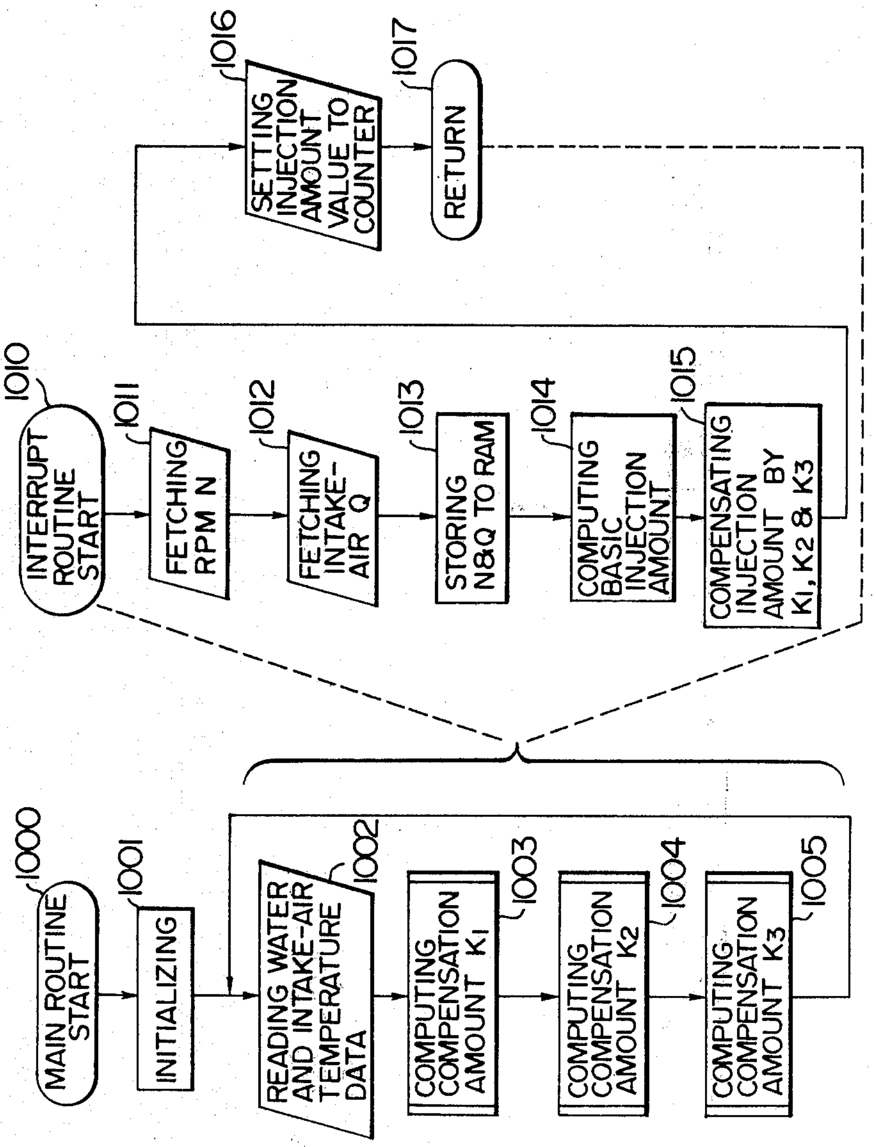
FIG. 3 is a simplified flow chart for the microprocessor shown in FIG. 2.

FIG. 3 shows a simplified flow chart for the microprocessor 100. The function of the microprocessor 100 as well as the operation of the entire embodiment will now be described with reference to the flow chart. When the key switch 18 (FIG. 2) and the starter switch 16 are turned on and then the engine is started, a first step 1000 starts the computational operations of the main routine shown on the left side of FIG. 3, so that a step 1001 performs an initialization process and the individual circuits of the computer are reset to their initial states. The next step 1002 reads in the digital values corresponding to the cooling water temperature and the intake-air temperature from the analog input ports 104. At step 1003 a correction value or compensation amount K1 is computed from results of the step 1002 and the computed result is stored in the RAM 107. At step 1004 the output signal of the combustion components sensor 14 from the digital input ports 103 is inputted, and an integration correction value or compensation amount K2 to be described later is increased or decreased as a function of an elapsing time by a timer 111, and the correction value K2 is loaded into the RAM 107.

Figure 4:
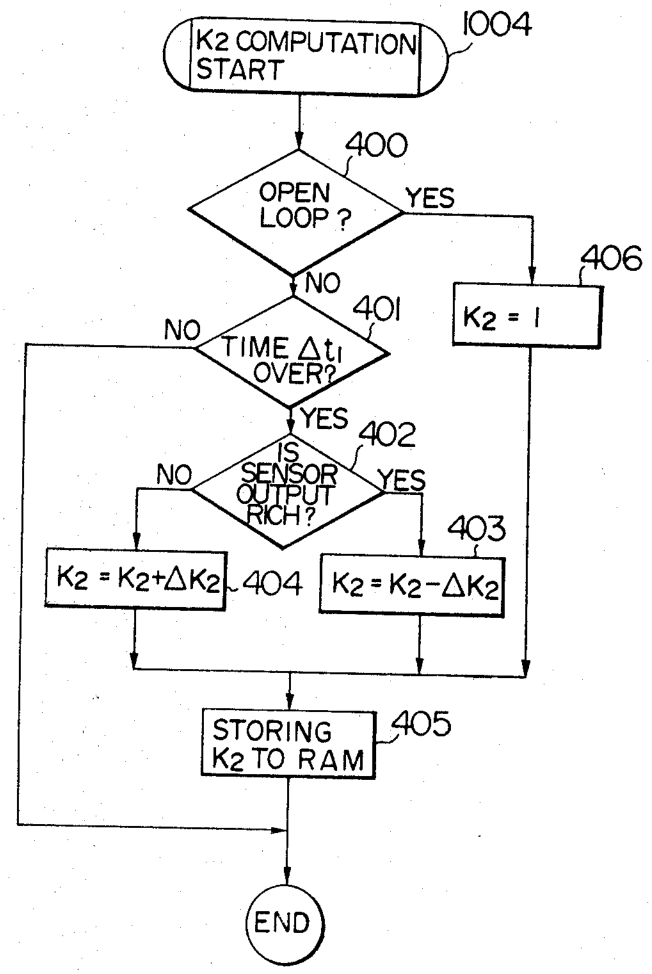
FIG. 4 is a detailed flow chart for the step 1004 shown in FIG. 3.

FIG. 4 is a detailed flow chart of the step 1004 for increasing or decreasing the integration correction value K2, that is, for integrating the correction value K2. A step 400 checks if the combustion components sensor is active or not or if it is possible or not to feed back indication of the air-fuel ratio by using a cooling water temperature. If an indication of the air-fuel ratio can not be fed back, or when the feedback loop is open, the program sequence advances to a step 406 where the correction value K2 is set to 1, $K2=1$. On the other hand, when the feedback of an indication of the air-fuel ratio is allowed, the program sequence advances to a step 401. The step 401 measures whether the time $\Delta t1$ from the preceding computing cycle has elapsed or not. If it has not elapsed, the correction amount K2 is not integrated and completes the computing process 1004. On the other hand, if the time $\Delta t1$ has elapsed, the program sequence advances to a step 402. When the air-fuel ratio is sensed as being rich and thus the combustion components sensor 14 produces a high level signal representing the rich air-fuel ratio, the program sequence advanced to a step 403 where the correction value K2 obtained in the preceding computing cycle is decremented by $\Delta K2$. Then, the program advances to the step 405. The step 405 loads the new K2 into the RAM 107. In the step 402, if the air-fuel ratio is sensed as being lean and thus the combustion components sensor 14 produces a low level signal representing the lean air-fuel ratio, the program sequence advances to a step 404 where the correction value K2 is incremented by $\Delta K2$ and then goes to the step 405. In this way, the correction value is increased or decreased. The step 1005 in FIG. 3 increases or decreases an engine condition correction value K3 and loads the result of such a processing into the RAM 107.

Figure 5:
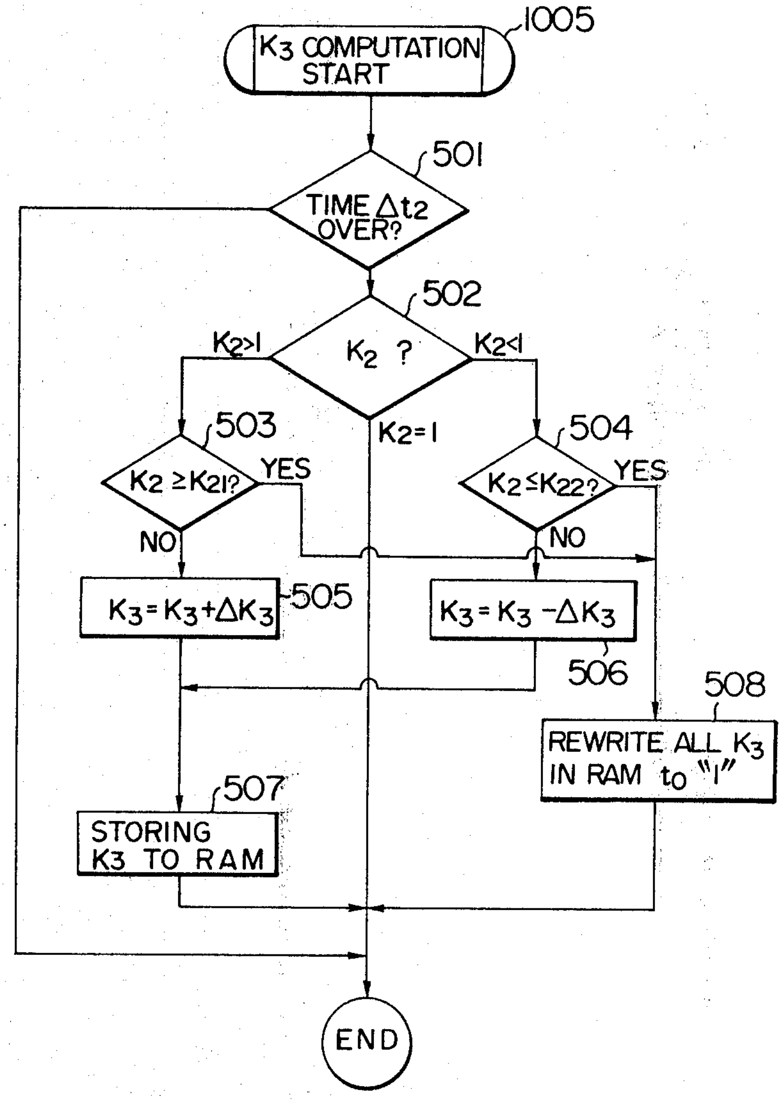
FIG. 5 is a detailed flow chart for the step 1005 shown in FIG. 3.

Turning now to FIG. 5, there is shown a detailed flow chart of the step 1005 for processing the correction value K3 and loading the result of the processing, that is, for executing the loading operation. A step 501 measures whether a time period $\Delta t2$ since the preceding computation cycle has elapsed or not. If it has not, the loading operation step 1005 is completed. If it has elapsed, the program sequence advances to a step 502 to judge the correction value K2. In the step, if the correction value K2 is 1, K=1, the loading operation step 1005 is completed without any task. The engine condition correction value or compensation amount K3 is computed in accordance with an engine condition and stored in the RAM 107. More precisely, the correction values K3 are previously determined on the basis of the amount of intake air Q and the number of revolutions N and those are stored in the RAM 107 in the form of a map as shown in FIG. 6. In the figure, the correction value K3 for the m-th intake air amount Q and the n-th engine speed N is expressed by $K_n^m$. In the map in the RAM 107, the engine speed N is set at 200 r.p.m. and the intake air amount Q has 32 divisions ranging from an idle state to the full throttle. In the step 502, if $K2>1$, the program sequence proceeds to a step 503. If $K2<1$, it proceeds to a step 504. In those steps, the correction value K2 is compared with the upper limit K21 and the lower limit K22. When the K2 is out of a region of values defined between the upper limit K21 and the lower limit K22, that is, $K2 \geqq K21$ or $K2 \leqq K22$, the program sequence advances to a step 508 where all the K3 stored in the RAM 107 are replaced by 1 and completes the step 1005 in the main routine. If, in step 503, K2 is smaller than the upper limit K21, i.e. $K21>K2>1$, the program sequence advanced to a step 505. The step 505 reads out the K3 corresponding to the current engine condition from the RAM 107, adds $\Delta K3$ to the K3 read out, and then advances to a step 507. The K3 incremented is stored in a corresponding address of the RAM 107. In the step 504, if K2 is larger than the lower limit K22, i.e., $1>K2>K22$, it advances to a step 506. The step 506 reads out the K3 in the address of the RAM 107 corresponding to the current engine condition, subtracts $\Delta K3$ from the K3 read out, and advances to a step 507. Following the step 507, the execution of the step 1005 ends. In the main routine shown in FIG. 3, upon the end of the step 1005, the program sequence returns to the step 1002. In this way, when the integration correction value K2 falls outside the range defined between the upper and lower limits, the engine condition correction value K3 stored in the RAM 107 as a non-volatile memory is not corrected and the correction values K3 are all replaced by 1.

Ordinarily, the execution of the main routine having the steps 1002 to 1005 is repeated in accordance with the control program. When receiving an interrupt signal of the fuel injection quantity from the interruption control unit 102, the microprocessor 100 even if it is processing the main routine, immediately halts in its processing and enters upon the execution of the interrupt routine of a step 1010. A step 1011 fetches a signal representing the engine speed N from the engine speed counter 101 and the next step 1012 fetches a signal representing an intake air quantity Q from the analog input ports 104. Then, a step 1013 loads the engine speed N or the number of revolutions and the intake air quantity Q into the RAM 107 for using those as parameters for the loading operation of the correction value K3 in the arithmetic operation of the main routine. The next step 1014 computes a basic fuel injection quantity, i.e., a basic injection time width to of the electromagnetic fuel injection valve 5, which is dependent solely upon the engine speed N and the intake air quantity Q. In this case, the computation is made by the equation $To=F\times Q/N$, where F is a constant. A step 1015 reads out various correction values for fuel injection from the RAM 107 to make a computation for correcting the injection quantity (the injection time width) to determine an air-fuel ratio. The injection time width T is given by; $T=To\times K1\times K2\times K3$. It follows that the data of the fuel injection quantity obtained in the step 1016 is set in the counter 109. After this, the program sequence steps to a step 1017 and returns to the main routine. When returning to the main routine, it returns to the step interrupted by the interrupt signal.

The microprocessor 100 operates as mentioned above.

As described above, a large number of the engine condition correction values K3 corresponding to the intake air quantities and the engine speeds are prepared, so that it is possible to promptly use a proper correction value corresponding to the current engine condition. As a result, according to the present invention it is possible to control the air-fuel ratio for all the engine conditions including transient periods, with a quick response. When the air-fuel ratio sensor fails and the integration correction value K2 deviates from the region between the upper and lower limits, the K3s are all replaced by 1 without performing the correction of the K3s. Accordingly, the air-fuel ratio never deviates greatly from its desired value.

When the integration correction value K2 goes beyond the upper or the lower limit (K21 to K22), the correction value K2 may be fixed to either the upper or the lower limit, or the correcting operation of the K3 may be omitted. Further, it is possible to determine if the K3 itself falls within the predetermined region between the upper and the lower limits or not. Alternatively, when the K2 or K3 goes outside the region of values between the upper and lower limits, a known alarm device may be connected to the control circuit 20 to provide an indication of abnormality.

The above-mentioned embodiment controls the air-fuel ratio by correcting the injection quantity in the electronic controlled fuel injection.

Alternatively, the air-fuel ratio may be controlled by correcting a correction value of an amount of the fuel supplied to a carburetor, an amount of air bypassing the carburetor or an amount of the secondary air supplied to the engine system, in accordance with the invention.

The invention is applicable for a control system controlling the EGR rate, an idle speed or the like in which a feedback control is employed, a loading operation step is used for loading an engine condition correction quantity into a read- and writable non-volatile memory in accordance with a feedback amount, and an engine is controlled based on both the information.

What is claimed is:

1. An apparatus for controlling an air-fuel ratio of a combustion engine comprising:

intake sensor means for sensing an intake condition of said combustion engine;

rotation sensor means for sensing a rotation speed of said combustion engine;

combustion components sensor means for sensing combustion components representative of an air-fuel ratio of mixture supplied to said combustion engine;

integrator means for integrating an output of said combustion components sensor means;

read/write memory means for storing a plurality of correction values in corresponding storage locations addressed by outputs of said intake sensor means and said rotation sensor means;

comparator means for comparing an output of said integrator means with predetermined upper and lower limit values;

means for correcting one of said correction values in increasing and decreasing directions when an output of said comparator means indicates that said output of said integrator means is inside said upper and lower limit values, said one of said correction values being read out from one of said storage locations addressed by said outputs of said intake sensor means and said rotation sensor means and an output of said correcting means being written in said one of said storage locations as said one of correction values;

means for replacing all of said correction values by a predetermined reference value when said output of said comparator means indicates that said output of said integrator means is outside said upper and lower limit values, said predetermined reference value being written in said storage location as said correction values; and control means for controlling an air-fuel ratio of said combustion engine in accordance with said one of said correction values.

2. A method for controlling the ratio of the air-fuel mixture supplied to an engine by using a signal representative of said ratio from a combustion components sensor comprising the steps of:

(a) integrating said sensor signal to obtain an integration correction value;

(b) monitoring at least one engine condition;

(c) generating an engine condition correction value on the basis of said integration correction value for each value of said monitored engine condition, comprising the steps of:

determining whether said integration correction value is within predetermined upper and lower limit values, correcting the engine condition correction value generated in the preceding cycle having a similar engine condition value, when said integration correction value is within the upper and lower limit values, and storing the corrected engine condition correction value in a memory; and (d) controlling the air-fuel ratio on the basis of said integration correction value and said engine condition correction value corresponding to the monitored engine condition value when said integration correction value is within said upper and lower limit values, and controlling the air-fuel ratio on the basis of said integration correction value without using said engine condition correction value when said integration correction value is outside said upper and lower limit values.

3. A method according to claim 2, wherein said controlling step includes the steps of:

controlling a fuel injection amount according to a value proportional to the product of a base fuel injection amount, the integration correction value and engine condition correction value; and setting all engine condition correction values stored in the memory to a predetermined value when said integration correction value is outside said upper and lower limit values, so that the air-fuel ratio is not corrected substantially by the engine condition correction value.

4. A method for controlling the ratio of the air-fuel mixture supplied to an engine by using a signal representative of said ratio from a combustion components sensor comprising the steps of:

(a) integrating a signal from said combustion components sensor to obtain an integration correction value;

(b) monitoring at least one engine condition;

(c) generating an engine condition correction value for each value of said monitored engine condition on the basis of said integration correction value, comprising the steps:

determining whether said integration correction value is within predetermined upper and lower limit values, correcting the engine condition correction value generated in the preceding cycle having a similar engine condition value by a fixed value and storing the corrected engine condition correction vlaue in a memory, when said integration correction value is within a predetermined upper and lower limit values, and rewriting all of said engine condition correction values stored in the memory to a predetermined number, when said integration correction value is outside the upper and lower limit values; and (d) controlling the air-fuel ratio substantially on the basis of said integration correction value and said engine condition correction value corresponding to the monitored engine condition value, so that the air-fuel ratio is adjusted substantially on the basis of changes in said integration correction value without using said engine condition correction value when said integration correction value is outside said upper and lower limit values.

5. A method according to claim 2 or 4, wherein said integrating step comprises the steps of:

determining whether the signal from said combustion components sensor indicates a rich or lean air-fuel mixture;

correcting said integration correcting value determined in a previous cycle by a fixed value, the direction of correction being related to the result of said determining step; and storing the corrected integration correction value to said memory.

6. A method for controlling the ratio of the air-fuel mixture supplied to an engine by using a signal representative of said ratio from a combustion component sensor comprising the steps of:

(a) integrating said sensor signal to obtain an integration correction value;

(b) monitoring at least one engine condition;

(c) generating an engine condition correction value on the basis of said integration correction value for each value of said monitored engine condition, comprising the steps of:

determining whether said integration correction value is larger or smaller than a first predetermined value, determining whether said integration correction value is larger than a predetermined upper limit, when said integration correction value is larger than said first predetermined value, correcting an engine condition correction value generated in the previous cycle having a similar engine condition value by adding a fixed amount to said engine condition correction value, when said integration correction value is smaller than said upper limit, determining whether said integration correction value is smaller than a predetermined lower limit, when said integration correction value is smaller than said first predetermined value, correcting said engine state correction value, generated in previous cycle by subtracting a fixed amount from said engine state correction value, when said integration correction value is larger than said lower limit, storing said corrected engine condition correction value when said integration correction value is within said upper and lower limits, and changing all of said engine condition correction values to a second predetermined value when the integration correction value is outside of said upper and lower limits; and (d) controlling the air-fuel ratio substantially on the basis of said integration correction value and engine condition correction value corresponding to the monitored engine condition value, so that said air-fuel ratio is effectively controlled on the basis of said integration correction value without using said engine condition correction value when said integration correction value is outside said upper and lower limits.

* * * * *